US012626162B2

(12) United States Patent
Isele et al.

(10) Patent No.: US 12,626,162 B2
(45) Date of Patent: May 12, 2026

(54) SYSTEM AND METHOD FOR UTILIZING A RECURSIVE REASONING GRAPH IN MULTI-AGENT REINFORCEMENT LEARNING

(71) Applicants: Honda Motor Co., Ltd., Tokyo (JP); The Board of Trustees of the Leland Stanford Junior University, Stanford, CA (US)

(72) Inventors: David F. Isele, San Jose, CA (US); Xiaobai Ma, Stanford, CA (US); Jayesh K. Gupta, Bellevue, WA (US); Mykel J. Kochenderfer, Palo Alto, CA (US)

(73) Assignees: Honda Motor Co., Ltd., Tokyo (JP); The Board of Trustees of the Leland Stanford Junior University, Stanford, CA (US)

( * ) Notice: Subject to any disclaimer, the term of this patent is extended or adjusted under 35 U.S.C. 154(b) by 1338 days.

(21) Appl. No.: 17/174,316

(22) Filed: Feb. 11, 2021

(65) Prior Publication Data
US 2022/0230080 A1 Jul. 21, 2022

Related U.S. Application Data

(60) Provisional application No. 63/139,690, filed on Jan. 20, 2021.

(51) Int. Cl.
*G06N 5/043* (2023.01)
*G01S 17/89* (2020.01)
(Continued)

(52) U.S. Cl.
CPC .............. *G06N 5/043* (2013.01); *G01S 17/89* (2013.01); *G06N 3/047* (2023.01); *G06N 3/092* (2023.01); *G06N 20/00* (2019.01)

(58) Field of Classification Search
CPC ........ G06N 5/043; G06N 20/00; G06N 3/092; G06N 7/01; G06N 3/95; G06M 3/047; G01S 17/931
See application file for complete search history.

(56) References Cited

U.S. PATENT DOCUMENTS

2023/0104513 A1* 4/2023 Isele ........................ G06N 7/01
706/12

OTHER PUBLICATIONS

Lowe, Ryan, Yi I. Wu, Aviv Tamar, Jean Harb, OpenAl Pieter Abbeel, and Igor Mordatch. "Multi-agent actor-critic for mixed cooperative-competitive environments." Advances in neural information processing systems 30 (2017). (Year: 2017).*
(Continued)

*Primary Examiner* — Kakali Chaki
(74) *Attorney, Agent, or Firm* — Rankin, Hill & Clark LLP

(57) ABSTRACT

A system and method for utilizing a recursive reasoning graph in multi-agent reinforcement learning that includes receiving data associated with an ego agent and a target agent that are traveling within a multi-agent environment and utilizing a multi-agent central actor-critic framework to analyze the data associated with the ego agent and the target agent. The system and method also include performing level-k recursive reasoning based on the multi-agent actor-critic framework to calculate higher level recursion actions of the ego agent and the target agent. The system and method further include controlling at least one of: the ego agent and the target agent to operate within the multi-agent environment based on at least one of: an agent action policy that is associated with the ego agent and an agent action policy that is associated with the target agent.

20 Claims, 7 Drawing Sheets

(51) Int. Cl.
| | |
|---|---|
| *G06N 3/047* | (2023.01) |
| *G06N 3/092* | (2023.01) |
| *G06N 20/00* | (2019.01) |

(56) References Cited

OTHER PUBLICATIONS

Wen, Ying, Yaodong Yang, Rui Luo, and Jun Wang. "Modelling bounded rationality in multi-agent interactions by generalized recursive reasoning." arXiv preprint arXiv:1901.09216 (2019). (Year: 2019) (Year: 2019).*

Moreno, G. (2020). Multi-agent deep reinforcement learning for autonomous driving (Order No. 31018258). Available from ProQuest Dissertations & Theses Global. (3059435577) (Year: 2020).*

Peng et al, "Multiagent Bidirectionally-Coordinated Nets: Emergence of Human-level Coordination in Learning to Play StarCraft Combat Games," 2017 (Year: 2017).*

Colin F Camerer, Teck-Hua Ho, and Juin-Kuan Chong. A cognitive hierarchy model of games. The Quarterly Journal of Economics, 119(3):861-898, 2004.

Harmen De Weerd, Rineke Verbrugge, and Bart Verheij. Higher-order theory of mind in negotiations under incomplete information. In International Conference on Principles and Practice of Multi-Agent Systems, pp. 101-116. Springer, 2013.

Jayesh K Gupta, Maxim Egorov, and Mykel Kochenderfer. Cooperative multi-agent control using deep reinforcement learning. In International Conference on Autonomous Agents and Multiagent Systems (AAMAS), pp. 66-83. Springer, 2017.

Tuomas Haarnoja, Aurick Zhou, Kristian Hartikainen, George Tucker, Sehoon Ha, Jie Tan, Vikash Kumar, Henry Zhu, Abhishek Gupta, Pieter Abbeel, et al. Soft actor-critic algorithms and applications. arXiv preprint arXiv:1812.05905, 2018.

Will Hamilton, Zhitao Ying, and Jure Leskovec. Inductive representation learning on large graphs. In Advances in Neural Information Processing Systems (NIPS), pp. 1024-1034, 2017.

He He, Jordan Boyd-Graber, Kevin Kwok, and Hal Daumé III. Opponent modeling in deep reinforcement learning. In International Conference on Machine Learning (ICML), pp. 1804-1813, 2016.

Matteo Hessel, Joseph Modayil, Hado Van Hasselt, Tom Schaul, Georg Ostrovski, Will Dabney, Dan Horgan, Bilal Piot, Mohammad Azar, and David Silver. Rainbow: Combining improvements in deep reinforcement learning. In AAAI Conference on Artificial Intelligence (AAAI), vol. 32, 2018.

Tobias Johannink, Shikhar Bahl, Ashvin Nair, Jianlan Luo, Avinash Kumar, Matthias Loskyll, Juan Aparicio Ojea, Eugen Solowjow, and Sergey Levine. Residual reinforcement learning for robot control. In IEEE International Conference on Robotics and Automation (ICRA), pp. 6023-6029, 2019.

Shihui Li, Yi Wu, Xinyue Cui, Honghua Dong, Fei Fang, and Stuart Russell. Robust multi-agent reinforcement learning via minimax deep deterministic policy gradient. In AAAI Conference on Artificial Intelligence (AAAI), 2019.

Michael Littman. Markov games as a framework for multi-agent reinforcement learning. In International Conference on Machine Learning (ICML). 1994.

Ryan Lowe, Yi Wu, Aviv Tamar, Jean Harb, Pieter Abbeel, and Igor Mordatch. Multi-agent actor-critic for mixed cooperative-competitive environments. In Advances in Neural Information Processing Systems (NeurIPS), pp. 6379-6390, 2017.

Anahita Mohseni-Kabir, David Isele, and Kikuo Fujimura. Interaction-aware multi-agent reinforcement learning for mobile agents with individual goals. In 2019 International Conference on Robotics and Automation (ICRA), pp. 3370-3376. IEEE, 2019.

Patro and Kishore Kumar Sahu. Normalization: A preprocessing stage. arXiv preprint arXiv:1503.06462, 2015.

Tabish Rashid, Mikayel Samvelyan, Christian Schroeder De Witt, Gregory Farquhar, Jakob Foerster, and Shimon Whiteson. Qmix: Monotonic value function factorisation for deep multi-agent reinforcement learning. arXiv preprint arXiv:1803.11485, 2018.

Tim Salimans, David A Knowles, et al. Fixed-form variational posterior approximation through stochastic linear regression. Bayesian Analysis, 8(4):837-882, 2013.

Macheng Shen and Jonathan P How. Robust opponent modeling via adversarial ensemble reinforcement learning in asymmetric imperfect-information games. arXiv preprint arXiv:1909.08735, 2019.

Peter Sunehag, Guy Lever, Audrunas Gruslys, Wojciech Marian Czarnecki, Vinicius Zambaldi, Max Jaderberg, Marc Lanctot, Nicolas Sonnerat, Joel Z Leibo, Karl Tuyls, et al. Value-decomposition networks for cooperative multi-agent earning. arXiv preprint arXiv:1706.05296, 2017.

Ming Tan. Multi-agent reinforcement learning: Independent versus cooperative agents. In International Conference on Machine Learning (ICML), pp. 330-337, 1993.

Petar Veličković, Guillem Cucurull, Arantxa Casanova, Adriana Romero, Pietro Liò, and Yoshua Bengio. Graph attention networks. In International Conference on Learning Representations, 2018.

Friedrich Burkhard Von Der Osten, Michael Kirley, and Tim Miller. The minds of many: Opponent modeling in a stochastic game. In International Joint Conference on Artificial Intelligence (IJCAI), pp. 3845-3851, 2017.

Ermo Wei and Sean Luke. Lenient learning in independent-learner stochastic cooperative games. Journal of Machine Learning Research, 17(1):2914-2955, 2016.

Ermo Wei, Drew Wicke, David Freelan, and Sean Luke. Multiagent soft q-learning. In AAAI Spring Symposium Series, 2018.

Ying Wen, Yaodong Yang, Rui Luo, Jun Wang, and Wei Pan. Probabilistic recursive reasoning for multi-agent reinforcement learning. In International Conference on Learning Representations, 2018.

Ying Wen, Yaodong Yang, Rui Luo, and Jun Wang. Modelling bounded rationality in multi-agent interactions by generalized recursive reasoning. arXiv preprint arXiv:1901.09216, 2019.

James Wright and Kevin Leyton-Brown. Beyond equilibrium: Predicting human behavior in normal-form games. In AAAI Conference on Artificial Intelligence (AAAI), vol. 24, 2010.

Jiachen Yang, Alireza Nakhaei, David Isele, Kikuo Fujimura, and Hongyuan Zha. Cm3: Cooperative multi-goal multi-stage multi-agent reinforcement learning. In International Conference on Learning Representations, 2019.

Oriol Vinyals, Igor Babuschkin, Wojciech M Czarnecki, Michaël Mathieu, Andrew Dudzik, Junyoung Chung, David H Choi, Richard Powell, Timo Ewalds, Petko Georgiev, et al. Grandmaster level in starcraft ii using multi-agent reinforcement learning. Nature, 575(7782):350-354, 2019.

* cited by examiner

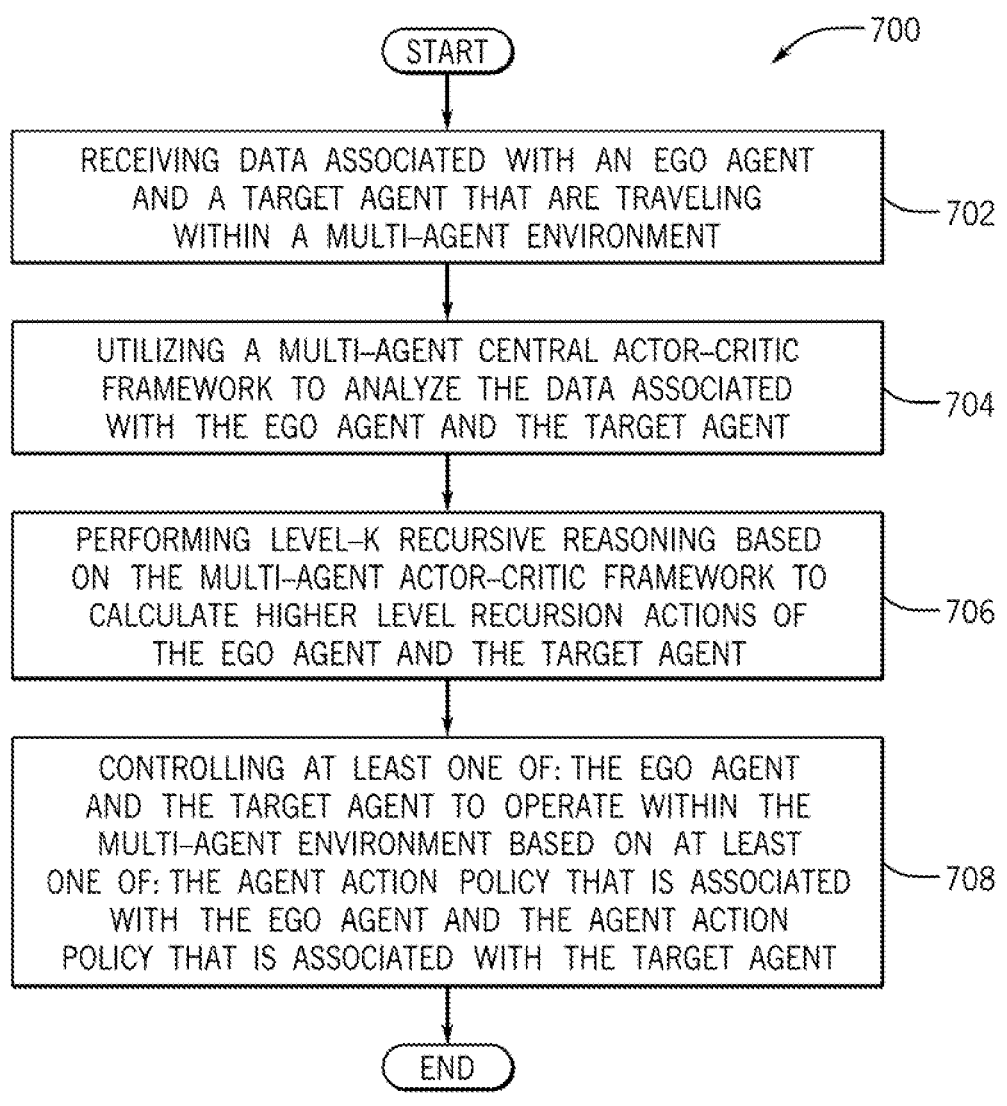

START

RECEIVING DATA ASSOCIATED WITH AN EGO AGENT
AND A TARGET AGENT THAT ARE TRAVELING
WITHIN A MULTI-AGENT ENVIRONMENT — 702

UTILIZING A MULTI-AGENT CENTRAL ACTOR-CRITIC
FRAMEWORK TO ANALYZE THE DATA ASSOCIATED
WITH THE EGO AGENT AND THE TARGET AGENT — 704

PERFORMING LEVEL-K RECURSIVE REASONING BASED
ON THE MULTI-AGENT ACTOR-CRITIC FRAMEWORK TO
CALCULATE HIGHER LEVEL RECURSION ACTIONS OF
THE EGO AGENT AND THE TARGET AGENT — 706

CONTROLLING AT LEAST ONE OF: THE EGO AGENT
AND THE TARGET AGENT TO OPERATE WITHIN THE
MULTI-AGENT ENVIRONMENT BASED ON AT LEAST
ONE OF: THE AGENT ACTION POLICY THAT IS ASSOCIATED
WITH THE EGO AGENT AND THE AGENT ACTION
POLICY THAT IS ASSOCIATED WITH THE TARGET AGENT — 708

END

FIG. 7

SYSTEM AND METHOD FOR UTILIZING A RECURSIVE REASONING GRAPH IN MULTI-AGENT REINFORCEMENT LEARNING

CROSS-REFERENCE TO RELATED APPLICATION

This application claims priority to U.S. Provisional Application Ser. No. 63/139,690 filed on Jan. 20, 2021, which is expressly incorporated herein by reference.

BACKGROUND

Many real-world scenarios involve interactions between multiple agents with limited information exchange. Multi-robot navigation and autonomous driving applications such as highway merging, four-way stops, and lane changing are examples of situations where interaction is required between multiple mobile agents. For example, two mobile agents may be attempting to make maneuvers that may cross each other's paths. Modeling interactions of various agents may be difficult as continuous leaning is necessary. In scenarios where complex interactions may occur between numerous agents adequate machine based understanding of multiple agent reasoning to properly model such interactions has not been successfully achieved.

BRIEF DESCRIPTION

According to one aspect, a computer-implemented method for utilizing a recursive reasoning graph in multi-agent reinforcement learning that includes receiving data associated with an ego agent and a target agent that are traveling within a multi-agent environment. The computer-implemented method also includes utilizing a multi-agent central actor-critic framework to analyze the data associated with the ego agent and the target agent. The computer-implemented method additionally includes performing level-k recursive reasoning based on the multi-agent actor-critic framework to calculate higher level recursion actions of the ego agent and the target agent. An output of the level-k recursive reasoning is used to learn an agent action policy that is associated with the ego agent and an agent action policy that is associated with the target agent. The computer-implemented method further includes controlling at least one of: the ego agent and the target agent to operate within the multi-agent environment based on at least one of: the agent action policy that is associated with the ego agent and the agent action policy that is associated with the target agent.

According to another aspect, a system for utilizing a recursive reasoning graph in multi-agent reinforcement learning that includes a memory storing instructions when executed by a processor cause the processor to receive data associated with an ego agent and a target agent that are traveling within a multi-agent environment. The instructions also cause the processor to utilize a multi-agent central actor-critic framework to analyze the data associated with the ego agent and the target agent. The instructions additionally cause the processor to perform level-k recursive reasoning based on the multi-agent actor-critic framework to calculate higher level recursion actions of the ego agent and the target agent. An output of the level-k recursive reasoning is used to learn an agent action policy that is associated with the ego agent and an agent action policy that is associated with the target agent. The instructions further cause the processor to control at least one of: the ego agent and the target agent to operate within the multi-agent environment based on at least one of: the agent action policy that is associated with the ego agent and the agent action policy that is associated with the target agent.

According to yet another aspect, a non-transitory computer readable storage medium storing instructions that when executed by a computer, which includes a processor perform a method that includes receiving data associated with an ego agent and a target agent that are traveling within a multi-agent environment. The method also includes utilizing a multi-agent central actor-critic framework to analyze the data associated with the ego agent and the target agent. The method additionally includes performing level-k recursive reasoning based on the multi-agent actor-critic framework to calculate higher level recursion actions of the ego agent and the target agent. An output of the level-k recursive reasoning is used to learn an agent action policy that is associated with the ego agent and an agent action policy that is associated with the target agent. The method further includes controlling at least one of: the ego agent and the target agent to operate within the multi-agent environment based on at least one of: the agent action policy that is associated with the ego agent and the agent action policy that is associated with the target agent.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 7 is a process flow diagram of a method for utilizing a recursive reasoning graph in multi-agent reinforcement learning according to an exemplary embodiment of the present disclosure.

DETAILED DESCRIPTION

Figure 1:
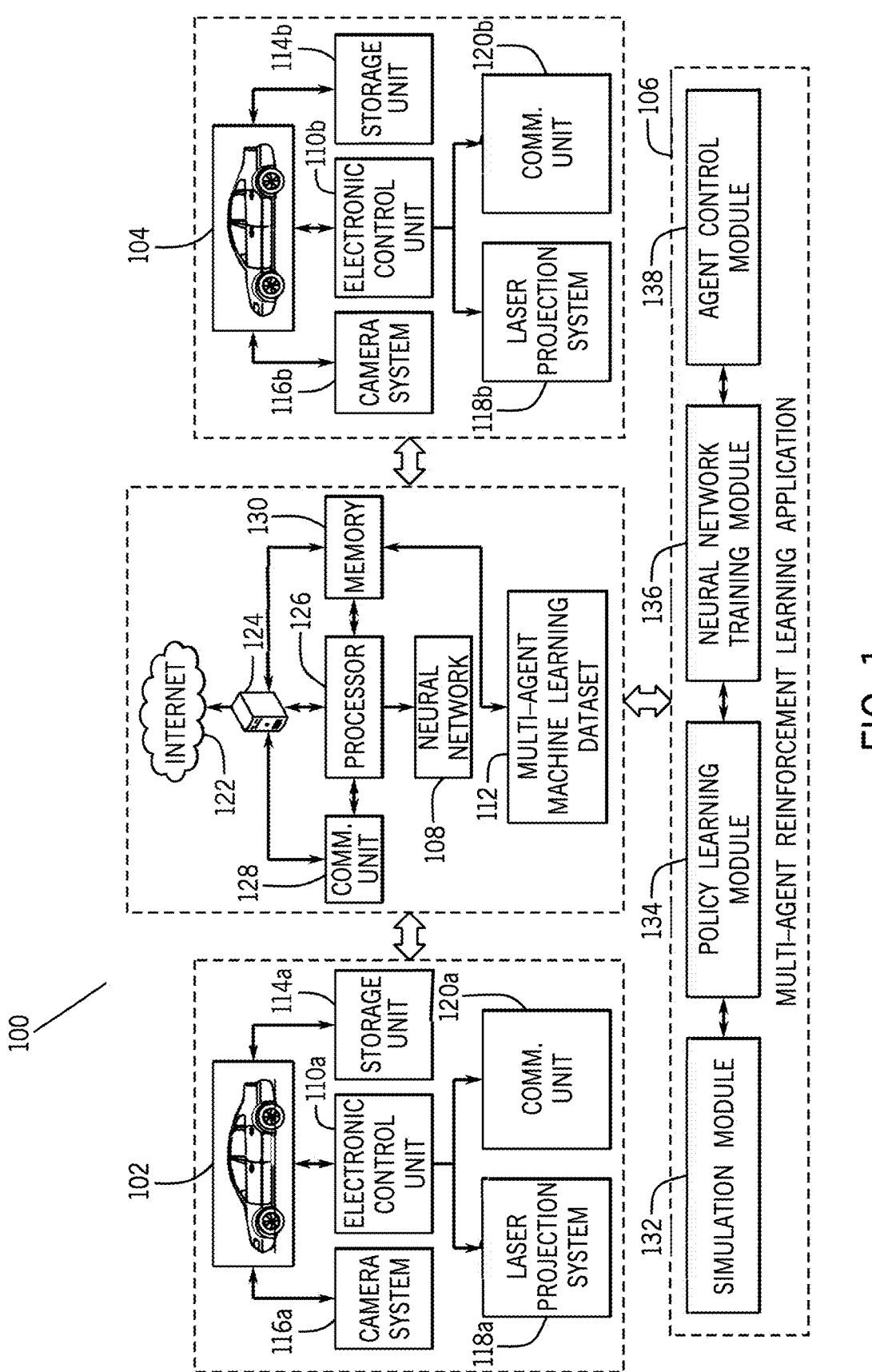
FIG. 1 is a schematic view of an exemplary system for utilizing a recursive reasoning graph in multi-agent reinforcement learning according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 utilizing a recursive reasoning graph in multi-agent reinforcement learning according to an exemplary embodiment of the present disclosure. The components of the system 100, as well as the components of other systems, hardware architectures, and software architectures discussed herein, may be combined, omitted, or organized into different architectures for various embodiments.

Generally, the system 100 includes an ego agent 102 and one or more target agents 104. For purposes of simplicity, this disclosure will describe the embodiments of the system 100 with respect to a single ego agent 102 and a single target agent 104. However, it is appreciated that the system 100 may include more than one ego agent 102 and more than one target agent 104 and that the embodiments and processes discussed herein may be utilized in an environment that includes one or more ego agents 102 and one or more target agents 104.

Figure 2:
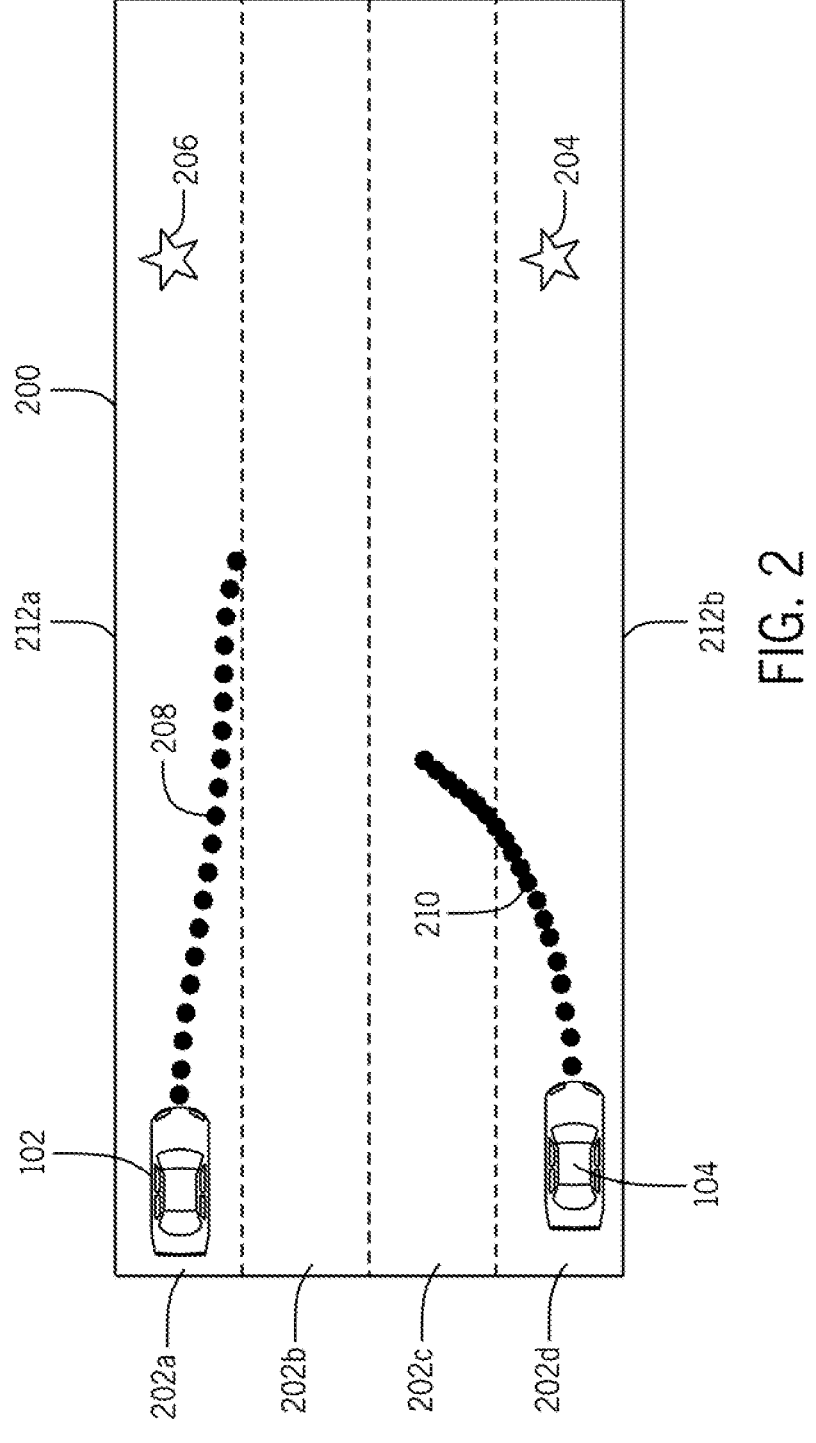
FIG. 2 is an illustrative example of a multi-agent environment according to an exemplary embodiment of the present disclosure.

As shown in the illustrative example of FIG. 2, the ego agent 102 and the target agent 104 may be traveling in a multi-agent environment 200. In one or more configurations, the ego agent 102 and/or the target agent 104 may include, but may not be limited to, an automobile, a robot, a forklift, a bicycle, an airplane, a construction crane, and the like that may be traveling within one or more types of multi-agent environments. In one embodiment, the multi-agent environment 200 may include, but may not be limited to areas that are evaluated to provide navigable pathways for the ego agent 102 and/or the target agent 104 that are traveling on the roadway 202, as shown in the illustrative example of FIG. 2.

In additional embodiments, one or more multi-agent environments may include, but may not be limited to, additional types of roadways such as a narrow street or tunnel and/or a pathway that may exist within a confined location such as a factory floor, a construction site, or an airport taxiway. For purposes of simplicity, the exemplary embodiments and examples discussed herein will mainly be described with reference to the multi-agent environment 200 that includes the roadway, as shown in the illustrative example of FIG. 2. However, it is appreciated that the multi-agent environment 200 may include the additional types of roadways, discussed above.

As shown in FIG. 2, the ego agent 102 and the target agent 104 may be traveling within adjacent lanes of a roadway 202 of the multi-agent environment 200. The ego agent 102 and the target agent 104 may be traveling in respective directions and in locations that are within a particular distance of one another. As shown, the ego agent 102 may be traveling on the road way 202a to reach a goal 204 (e.g., way point, destination) while the target agent 104 may be traveling on the road way 202d to reach a goal 206 (e.g., way point, destination). In some instances, as shown, a path 208 of the ego agent 102 may potentially cross a path 210 of the target agent 104 as each of the agents 102, 104 are attempting to reach their respective goals 204, 206.

With reference FIG. 1 and FIG. 2, in an exemplary embodiment, the system 100 may include a multi-agent recursive reasoning reinforcement learning application (multi-agent application) 106 that may be configured to complete multi-agent reinforcement learning for simultaneously learning policies for multiple agents interacting amongst one another. As discussed below, one or more policies may be executed to autonomously control the ego agent 102 and/or the target agent 104 to reach their respective goals 204, 206 while taking one another into account. As discussed below, the multi-agent application 106 may be configured to utilize a neural network 108 and may execute instructions to utilize a recursive reasoning model in a centralized-training-decentralized execution framework to facilitate maneuvers within the multi-agent environment 200 with respect to the agents 102, 104.

The multi-agent application 106 may execute a recursive reasoning graph as a graph structure that may be utilized in a simulation of the multi-agent environment 200 to mimic a recursive reasoning procedure under the centralized-training-decentralized-execution framework for multi-agent reinforcement learning. The multi-agent application 106 may thereby be configured to utilize a multi-agent central actor critic model (shown in FIG. 6) to learn one or more agent action policies that account for the actions of the ego agent 102 and the target agent 104 that are traveling within the multi-agent environment 200.

The ego agent 102 and the target agent 104 are evaluated as the central actors and are treated as nodes to build the recursive reasoning graph to efficiently calculate higher level recursive actions of interacting agents. As central actors, the ego agent 102 and the target agent 104 are analyzed as self-interested agents that are attempting to reach their respective goals 204, 206 in a most efficient manner. The multi-agent central actor critic model includes one or more iterations of Markov Games where one or more critics evaluate one or more actions (output of actor models) taken by a simulated ego agent and a simulated target agent to determine one or more rewards and one or more states related to a goal-specific reward function.

The recursive reasoning graph structure enables the multi-agent application 106 to model the relationship between the ego agent 102 and the target agent 104 and may explicitly consider their responses as central actors. The recursive actions of each agent 102, 104 are efficiently sampled and shared through message passing in the graph. Accordingly, the recursive reasoning graph executed by the multi-agent application 106 explicitly models the recursive reasoning process of the agents 102, 104 in general-sum games. As discussed below, the multi-agent application 106 may be configured to augment the existing centralized-training-decentralized-execution algorithms with centralized actors and graph-like message passing to efficiently train learning agents in a simulated environment (shown in FIG. 4) that represent the agents 102, 104 of the multi-agent environment 200.

Stated differently, the multi-agent application 106 utilizes the multi-agent central actor critic model to perform centralized training, then decentralized execution. The multi-agent application 106 accordingly evaluates the positions, locations, and paths of all agents 102, 104. As discussed, the multi-agent application 106 may evaluate the actions of the ego agent 102 from the perspective of the target agent 104 and may evaluate the actions of the target agent 104 from the perspective of the ego agent 102. Accordingly, the Markov Game simulation completed by the multi-agent application 106 may take account the actions of both the ego agent 102 and the target agent 104 as central actors.

In one or more embodiments, the multi-agent application 106 may be configured to learn multiple interactive policies for multiple agents, including, but not limited to, the ego agent 102 and the target agent 104 that are traveling within the multi-agent environment 200. In particular, the output of the graph are utilized to thereby learn respective agent action policies that may be utilized to enable the ego agent 102 and/or the target agent 104 to be autonomously operated to reach their respective goals 204, 206 while accounting for one another within the multi-agent environment 200.

This functionality allows the multi-agent application 106 to acquire knowledge regarding the actions of all of the agents 102, 104 simultaneously rather than to optimize different agent actions separately. Additionally, this functionality allows the multi-agent application 106 to learn multiple agent action policies associated with each of the ego agent 102 and the target agent 104. As discussed below, the multi-agent application 106 may incorporate actions of the ego agent 102 to learn the agent action policy associated with the target agent 104. Additionally, the multi-agent application 106 may incorporate actions of the target agent 104 to learn the agent action policy associated with the ego agent 102.

This may be accomplished by the use of level-k reasoning to assume an opposing agent's reasoning into the respective agent's reasoning to reach their respective goal. For example, the level-k reasoning allows the multi-agent application 106 to assume the reasoning of the target agent 104 with respect to following the path 208 of reaching its goal 204 when learning the ego agent's agent action policy. Similarly, the level-K reasoning allows the multi-agent application 106 to assume the reasoning of the ego agent 102 with respect to following the path 210 of reaching its goal 206 when learning the target agent's agent action policy. The level-k reasoning may incorporate a plurality of levels (e.g., level-zero reasoning, level-one reasoning, level-two reasoning, level-k reasoning) to thereby provide action determinations regarding opposing agent's actions in each agent 102, 104 reaching their respective goal.

As discussed below, upon learning the agent action policy associated with the ego agent 102 and the agent action policy associated with the target agent 104, the multi-agent application 106 may be configured to train the neural network 108 with the respective agent action policies. As discussed below, the multi-agent application 106 may communicate with the neural network 108 to receive the respective agent action policies associated with the ego agent 102 and/or the target agent 104 to be executed to control autonomous operation (e.g., driving) of the ego agent 102 and/or the target agent 104 to thereby follow particular paths at a particular speed, acceleration rate, steering angle, deceleration rate, and the like while maneuvering within the multi-agent environment 200 to reach the respective goals 204, 206 without any conflict amongst one another. Accordingly, the agent action policies may be utilized by the multi-agent application 106 to autonomously control the ego agent 102 and/or the target agent 104 within the multi-agent environment 200 and/or similar multi-agent environments (e.g., real-world environments) that include similar driving scenarios to safely and efficiently navigate to their respective goals 204, 206.

As discussed below, the multi-agent application 106 may determine a virtual simulated model of the multi-agent environment 200 in which the ego agent 102 and the target agent 104 and the respective goals 204, 206 are virtually represented at each discrete time step. The simulated model may be determined based on image data and/or LiDAR data that may be provided to the multi-agent application 106 by one or more components of the ego agent 102 and/or the target agent 104. For example, the simulated model may include lanes 202a, 202d on which the ego agent 102 and the target agent 104 are traveling in addition to lanes 202b, 202c that fall between the lanes 202a, 202d on which the ego agent 102 and the target agent 104 are traveling. As discussed below, the simulated model includes respective observations and respective goals that may be inputted into the multi-central actor critic model and used to complete level-k recursive reasoning to learn the agent action policies respectively associated with the ego agent 102 and the target agent 104.

With continued reference to FIG. 1, the ego agent 102 and the target agent 104 may include respective electronic control devices (ECUs) 110a, 110b. The ECUs 110a, 110b may execute one or more applications, operating systems, vehicle system and subsystem executable instructions, among others. In one or more embodiments, the ECUs 110a, 110b may include a respective microprocessor, one or more application-specific integrated circuit(s) (ASIC), or other similar devices. The ECUs 110a, 110b may also include respective internal processing memory, an interface circuit, and bus lines for transferring data, sending commands, and communicating with the plurality of components of the ego agent 102 and/or the target agent 104.

The ECUs 110a, 110b may also include a respective communication device (not shown) for sending data internally to components of the respective agents 102, 104 and communicating with externally hosted computing systems (e.g., external to the agents 102, 104). Generally, the ECUs 110a, 110b communicate with respective storage units 114a, 114b to execute the one or more applications, operating systems, vehicle systems and subsystem user interfaces, and the like that are stored within the respective storage units 114a, 114b.

In some embodiments, the storage units 114a, 114b may respectively store the respectively learned agent-action polices associated with the ego agent 102 and/or the target agent 104. Accordingly, the storage units 114a, 114b may be accessed by the multi-agent application 106 to store the respective agent-action polices learned by the application 106 to be followed by the respective agents 102, 104. In some embodiments, the storage units 114a, 114b may be accessed by the application 106 to retrieve the respective agent-action polices to autonomously control the operation of the ego agent 102 and/or the target agent 104 to account for the presence of one another (e.g., other agents) within the multi-agent environment 200.

In an exemplary embodiment, the ECUs 110a, 110b may be configured to operably control the plurality of components of the respective agents 102, 104. The ECUs 110a, 110b may additionally provide one or more commands to one or more control units (not shown) of the agents 102, 104 including, but not limited to a respective engine control unit, a respective braking control unit, a respective transmission control unit, a respective steering control unit, and the like to control the ego agent 102 and/or target agent 104 to be autonomously operated.

With continued reference to FIG. 1, the respective storage units 114a, 114b of the ego agent 102 and the target agent 104 may be configured to store one or more executable files associated with one or more operating systems, applications, associated operating system data, application data, vehicle system and subsystem user interface data, and the like that are executed by the respective ECUs 110a, 110b. In one or more embodiments, the storage units 114a, 114b may be accessed by the multi-agent application 106 to store data, for example, one or more images, videos, one or more sets of image coordinates, one or more sets of LiDAR coordinates (e.g., LiDAR coordinates associated with the position of an object), one or more sets of locational coordinates (e.g., GPS/DGPS coordinates) and/or vehicle dynamic data associated respectively with the ego agent 102 and the target agent 104.

The ECUs 110a, 110b may be additionally configured to operably control respective camera systems 116a, 116b of the ego agent 102 and the target agent 104. The camera systems 116a, 116b may include one or more cameras that are positioned at one or more exterior portions of the respective agents 102, 104. The camera(s) of the camera systems 116a, 116b may be positioned in a direction to capture the surrounding environment of the respective agents 102, 104 that include predetermined areas located around (front/sides/behind) the respective agents 102, 104 of the multi-agent environment 200.

In one or more configurations, the one or more cameras of the respective camera systems 116a, 116b may be disposed at external front, rear, and/or side portions of the respective agents 102, 104 including, but not limited to different portions of the bumpers, lighting units, fenders/body panels, and/or windshields. The one or more cameras may be positioned on a respective planar sweep pedestal (not shown) that allows the one or more cameras to be oscillated to capture images of the surrounding environments of the respective agents 102, 104.

With respect to the ego agent 102, the multi-agent application 106 may receive image data associated with untrimmed images/video of the surrounding environment of the ego agent 102 from the camera system 116a and may execute image logic to analyze the image data and determine ego agent image based observations associated with the multi-agent environment 200, one or more target agents 104 that may be located within the multi-agent environment 200, one or lanes 202a-202d (pathways) within the multi-agent environment 200, and/or one or more objects (not shown) that may be located within the multi-agent environment 200.

With respect to the target agent 104, the multi-agent application 106 may receive image data associated with untrimmed images/video of the surrounding environment of the target agent 104 from the camera system 116b and may execute image logic to analyze the image data and determine target agent image based observations associated with the multi-agent environment 200, the ego agent 102 that may be located within the multi-agent environment 200, one or lanes 202a-202d (pathways) within the multi-agent environment 200, and/or one or more objects (not shown) that may be located within the multi-agent environment 200.

In one or more embodiments, the ECUs 110a, 110b may also be operably connected to respective vehicle laser projection systems 118a, 118b that may include one or more respective LiDAR transceivers (not shown). The one or more respective LiDAR transceivers of the respective vehicle laser projection systems 118a, 118b may be disposed at respective external front, rear, and/or side portions of the respective agents 102, 104, including, but not limited to different portions of bumpers, body panels, fenders, lighting units, and/or windshields.

The one or more respective LiDAR transceivers may include one or more planar sweep lasers that include may be configured to oscillate and emit one or more laser beams of ultraviolet, visible, or near infrared light toward the surrounding environment of the respective agents 102, 104. The vehicle laser projection systems 118a, 118b may be configured to receive one or more reflected laser waves based on the one or more laser beams emitted by the LiDAR transceivers. The one or more reflected laser waves may be reflected off of one or more boundaries 212a, 212b (e.g., guardrails) of the multi-agent environment 200, and/or one or more objects (e.g., other agents, cones, pedestrians, etc.) that may be located within the multi-agent environment 200.

In an exemplary embodiment, the vehicle laser projection systems 118a, 118b may be configured to output LiDAR data associated to one or more reflected laser waves. With respect to the ego agent 102, the multi-agent application 106 may receive LiDAR data communicated by the vehicle laser projection system 118a and may execute LiDAR logic to analyze the LiDAR data and determine ego agent LiDAR based observations associated with the multi-agent environment 200, and more specifically the lane 202a on which the ego agent 102 is traveling, additional lanes 202b-202d included within the multi-agent environment 200, one or more target agents 104 that may be located within the multi-agent environment 200, one or more boundaries 212a, 212b of the multi-agent environment 200, and/or one or more objects that may be located within the multi-agent environment 200.

With respect to the target agent 104, the multi-agent application 106 may receive LiDAR data communicated by the vehicle laser projection system 118b and may execute LiDAR logic to analyze the LiDAR data and determine target agent LiDAR based observations associated with the multi-agent environment 200, and more specifically the lane 202d on which the target agent 104 is traveling, additional lanes 202a-202c included within the multi-agent environment 200, the ego agent 102 that may be located within the multi-agent environment 200, one or more boundaries 212a, 212b of the multi-agent environment 200, and/or one or more objects that may be located within the multi-agent environment 200.

In one or more embodiments, the ego agent 102 and the target agent 104 may additionally include respective communication units 120a, 120b that may be operably controlled by the respective ECUs 110a, 110b of the respective agents 102, 104. The communication units 120a, 120b may each be operably connected to one or more transceivers (not shown) of the respective agents 102, 104. The communication units 120a, 120b may be configured to communicate through an internet cloud 122 through one or more wireless communication signals that may include, but may not be limited to Bluetooth® signals, Wi-Fi signals, ZigBee signals, Wi-Max signals, and the like. In some embodiments, the communication unit 120a of the ego agent 102 may be configured to communicate via vehicle-to-vehicle (V2V) with the communication unit 120b of the target agent 104 to exchange information about the positon, speed, steering angles, acceleration rates, deceleration rates, and the like of the agents 102, 104 traveling within the multi-agent environment 200.

In one embodiment, the communication units 120a, 120b may be configured to connect to the internet cloud 122 to send and receive communication signals to and from an externally hosted server infrastructure (external server) 124. The external server 124 may host the neural network 108 and may execute the multi-agent application 106 to utilize processing power to learn one or more respective agent action policies and to thereby train the neural network 108 with the one or more respective agent action policies associated with the ego agent 102 and/or the target agent 104.

In particular, the neural network 108 may be trained at one or more time steps based on learning of one or more agent action policies that are associated with the ego agent 102 and/or the target agent 104 that are traveling within the multi-agent environment 200. The training of the neural network 108 may allow the agents 102, 104 to receive data pertaining to real-time or similar multi-agent scenarios (e.g., ego agent 102 and target agent 104 located with respect to one another) that may occur within a multi-agent environment 200 to ensure that policies are learned that may be utilized by the ego agent 102 and/or the target agent 104 to simultaneously achieve respective goals 204, 206 in a nonconflicting manner while accounting for one another within the multi-agent environment 200.

In an exemplary embodiment, components of the external server 124 including the neural network 108 may be operably controlled by a processor 126. The processor 126 may be configured to operably control the neural network 108 to utilize machine learning/deep learning to provide artificial intelligence capabilities that may be utilized to build a multi-agent machine learning dataset 112.

With continued reference to the external server 124, the processor 126 may be operably connected to a memory 130. The memory 130 may store one or more operating systems, applications, associated operating system data, application data, executable data, and the like. In one embodiment, the processor 126 may be configured to process information derived from one or more agent action polices associated with the ego agent 102 and/or the target agent 104 learned by the multi-agent application 106 at one or more time steps that may be utilized to train the neural network 108 by updating the multi-agent machine learning dataset 112 stored on the memory 130.

In one or more embodiments, the multi-agent machine learning dataset 112 may be configured as a dataset that includes one or more fields associated with each of the ego agent 102 and the target agent 104 with travel pathway geo-location information associated with one or more perspective pathways and vehicle dynamics data associated with particular speeds, acceleration rates, steering angles, deceleration rates, and the like that may be determined to be utilized by the ego agent 102 and/or the target agent 104 to reach the respective goals 204, 206 based on the learned agent action policies respectively associated with the ego agent 102 and/or the target agent 104.

In one embodiment, the processor 126 of the external server 124 may additionally be configured to communicate with a communication unit 128. The communication unit 128 may be configured to communicate through the internet cloud 122 through one or more wireless communication signals that may include, but may not be limited to Bluetooth® signals, Wi-Fi signals, ZigBee signals, Wi-Max signals, and the like. In one embodiment, the communication unit 128 may be configured to connect to the internet cloud 122 to send and receive communication signals to and from the ego agent 102 and/or the target agent 104. In particular, the external server 124 may receive image data and LiDAR data that may be communicated by the ego agent 102 and/or the target agent 104 based on the utilization of one or more of the camera systems 116a, 116b and the vehicle laser projection systems 118a, 118b. As discussed below, such data may be utilized to determine simulated multi-agent environment that pertains to the multi-agent environment 200 (real-world) and is used with respect to multi-agent recursive reasoning reinforcement learning executed by the multi-agent application 106.

II. The Multi-Agent Recursive Reasoning Reinforcement Learning Application, Related Methods, and Illustrative Policy Results Examples The components of the multi-agent application 106 will now be described according to an exemplary embodiment and with reference to FIG. 1. In an exemplary embodiment, the multi-agent application 106 may be stored on the memory 130 and executed by the processor 126 of the external server 124. In another embodiment, the multi-agent application 106 may be stored on the storage unit 114a of the ego agent 102 and may be executed by the ECU 110a of the ego agent 102. In some embodiments, in addition to be stored and executed by the external server 124 and/or by the ego agent 102, the application 106 may also be executed by the ECU 110b of the target agent 104.

The general functionality of the multi-agent application 106 will now be discussed. In an exemplary embodiment, the multi-agent application 106 may include a simulation module 132, a policy learning module 134, a neural network training module 136, and an agent control module 138. However, it is to be appreciated that the multi-agent application 106 may include one or more additional modules and/or sub-modules that are included in addition to the modules 132-138. Methods and examples describing process steps that are executed by the modules 132-138 of the multi-agent application 106 will now be described in more detail.

Figure 3:
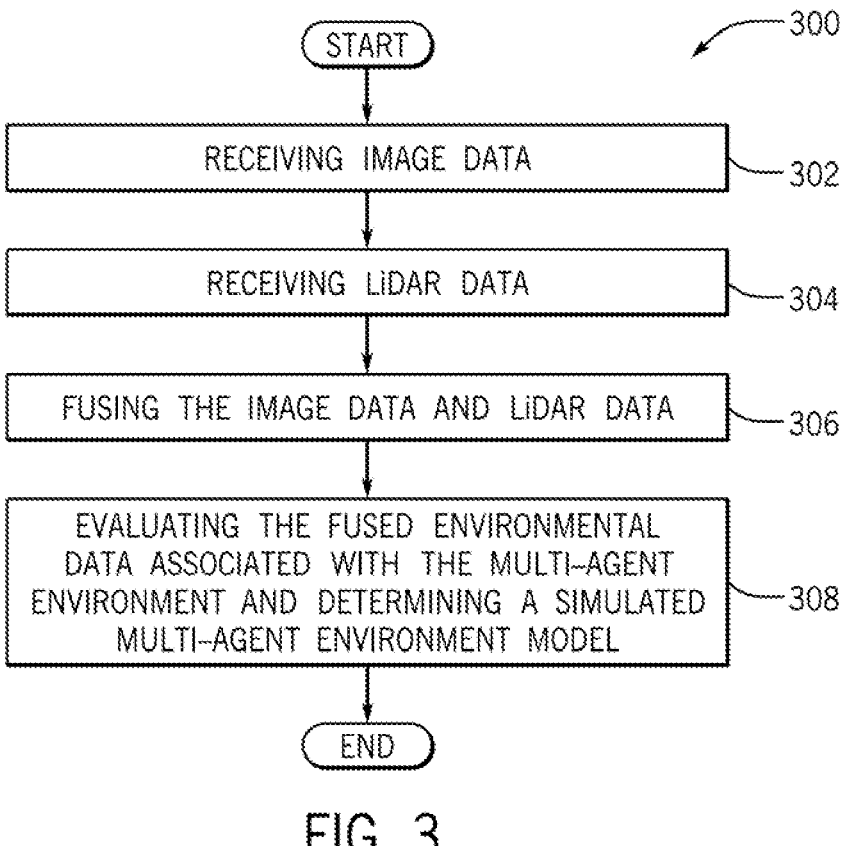
FIG. 3 is a process flow diagram of a method for receiving data associated with the multi-agent environment and processing a simulated multi-agent environment model according to an exemplary embodiment of the present disclosure.

FIG. 3 is a process flow diagram of a method 300 for receiving data associated with the multi-agent environment 200 in which the ego agent 102 and the target agent 104 are traveling and processing a simulated multi-agent environment model (simulated model) which virtually represents the multi-agent environment 200 according to an exemplary embodiment of the present disclosure. FIG. 3 will be described with reference to the components of FIG. 1, FIG. 2, and FIG. 4, though it is to be appreciated that the method of FIG. 3 may be used with other systems/components.

As discussed above, the simulated model may be determined by the application 106 as a virtual representation (e.g., virtual model) of the multi-agent environment 200 to be utilized within the multi-agent central actor critic model. In particular, the simulated model may be determined by the application 106 as a virtual world model of the multi-agent environment 200 that is utilized when executing one or more iterations of Markov games to learn the agent action policy associated with the ego agent 102 and/or the agent action policy associated with the target agent 104.

In an exemplary embodiment, the method 300 may begin at block 302, wherein the method 300 may include receiving image data. In one embodiment, the simulation module 132 may communicate with the camera system 116a of the ego agent 102 and/or the camera system 116b of the target agent 104 to collect untrimmed images/video of the surrounding environment of the agents 102, 104. The untrimmed images/video may include a 360 degree external views of the surrounding environments of the agents 102, 104 that includes the multi-agent environment 200.

With reference to the illustrative example of FIG. 2, from the perspective of the ego agent 102, such views may include observations of the ego agent 102 that include the target agent 104, the goal 204 of the ego agent 102, lanes 202a-202d included within the multi-agent environment 200, and boundaries 212a, 212b of the multi-agent environment 200. Additionally, from the perspective of the target agent 104, such views may include observations of the target agent 104 that include the ego agent 102, the goal 206 of the target agent 104, lanes 202a-202d included within the multi-agent environment 200, and boundaries 212a, 212b of the multi-agent environment 200. In one embodiment, the simulation module 132 may package and store the image data received from the camera system 116a and/or the image data received from the camera system 116b on the memory 130 of the external server 124 to be further evaluated by the simulation module 132.

The method 300 may proceed to block 304, wherein the method 300 may include receiving LiDAR data. In an exemplary embodiment, the simulation module 132 may communicate with the vehicle laser projection system 118a of the ego agent 102 and/or the vehicle laser projection system 118b of the target agent 104 to collect LiDAR data that includes LiDAR based observations from the ego agent 102 and/or the target agent 104. The LiDAR based observations may indicate the location, range, and positions of the one or more objects off which the reflected laser waves were reflected with respect to a location/position of the respective agents 102, 104.

With reference again to FIG. 2, from the perspective of the ego agent 102, the simulation module 132 may communicate with the vehicle laser projection system 118a of the ego agent 102 to collect ego agent LiDAR based observations that classifies sets of LiDAR coordinates that are associated with the target agent 104, the goal 204 of the ego agent 102 and boundaries 212a, 212b of the multi-agent environment 200. Additionally, from the perspective of the target agent 104, the simulation module 132 may communicate with the vehicle laser projection system 118b of the target agent 104 to collect target agent LiDAR based observations that classifies sets of LiDAR coordinates that are associated with the ego agent 102, the goal 206 of the ego agent 102 and boundaries 212a, 212b of the multi-agent environment 200. In one embodiment, the simulation module 132 may package and store the ego agent LiDAR based observations received from the vehicle laser projection system 118a and/or the target agent LiDAR based observations received from the vehicle laser projection system 118b on the memory 130 of the external server 124 to be further evaluated by the simulation module 132.

The method 300 may proceed to block 306, wherein the method 300 may include fusing the image data and LiDAR data. In an exemplary embodiment, the simulation module 132 may communicate with the neural network 108 to provide artificial intelligence capabilities to conduct multimodal fusion of the image data received from the camera system 116a of the ego agent 102 and/or the camera system 116b of the target agent 104 with the LiDAR data received from the vehicle laser projection system 118a of the ego agent 102 and/or the vehicle laser projection system 118b of the target agent 104. The simulation module 132 may aggregate the image data and the LiDAR data into fused environmental data that is associated with the multi-agent environment 200 to be evaluated further by the simulation module 132.

As an illustrative example, the simulation module 132 may communicate with the neural network 108 to provide artificial intelligence capabilities to utilize one or more machine learning/deep learning fusion processes to aggregate the image data received from the camera system 116a of the ego agent 102 and the image data received from the camera system 116b of the target agent 104 into aggregated image data. Accordingly, the ego agent image based observations of the multi-agent environment 200 may be aggregated with the target agent image based observations of the multi-agent environment 200.

The simulation module 132 may also utilize the neural network 108 to provide artificial intelligence capabilities to utilize one or more machine learning/deep learning fusion processes to aggregate the LiDAR data received from the vehicle laser projection system 118a of the ego agent 102 and the LiDAR data received from the vehicle laser projection system 118a of the target agent 104 into aggregated LiDAR data. Accordingly, the ego agent LiDAR based observations of the multi-agent environment 200 may be aggregated with the target agent LiDAR based observations of the multi-agent environment 200. The simulation module 132 may additionally employ the neural network 108 to provide artificial intelligence capabilities to utilize one or more machine learning/deep learning fusion processes to aggregate the aggregated image data and the aggregated LiDAR data into fused environmental data.

The method 300 may proceed to block 308, wherein the method 300 may include evaluating the fused environmental data associated with the multi-agent environment 200 and determining a simulated multi-agent environment model. In an exemplary embodiment, the simulation module 132 may communicate with the neural network 108 to utilize one or more machine learning/deep learning fusion processes to evaluate the fused environmental data to determine one or more sets of environmental coordinates that are based on the aggregated observations of the ego agent 102 and the target agent 104.

The one or more sets of environmental coordinates may include positional coordinates (e.g., x, y grid world coordinates) that represent the ego agent 102, the target agent 104, the boundaries of the multi-agent environment 200, respective goals 204, 206 associated with the ego agent 102 and the target agent 104 (defined based on the source of the image data and/or the LiDAR data), and lanes on which the ego agent 102 and the target agent 104 may travel within the multi-agent environment 200 to be utilized to process the simulated environment.

The one or more sets of environmental coordinates may thereby define a simulated model (e.g., virtual grid world) that is representative of the multi-agent environment 200 that includes the ego agent 102 and the target agent 104 and may be utilized to execute one or more iterations of Markov games to learn the single agent policies and multi-agent policies associated with the ego agent 102 and the target agent 104. As discussed below, the simulated model includes a virtual ego agent that represents the ego agent 102 and a virtual target agent that represents the target agent 104 along with virtual markers that may represent respective goals 204, 206, lanes 202a-202d on a roadway of the multi-agent environment 200, and the boundaries 212a, 212b of the multi-agent environment 200.

In an exemplary embodiment, upon determining the simulated model (at block 308 of the method 300), the simulation module 132 may communicate data pertaining to the simulated model to the policy learning module 134. The policy learning module 134 may thereby utilize the simulated model to execute one or more iterations of stochastic games to learn the respective agent action policies associated with the ego agent 102 and the target agent 104.

Figure 4:
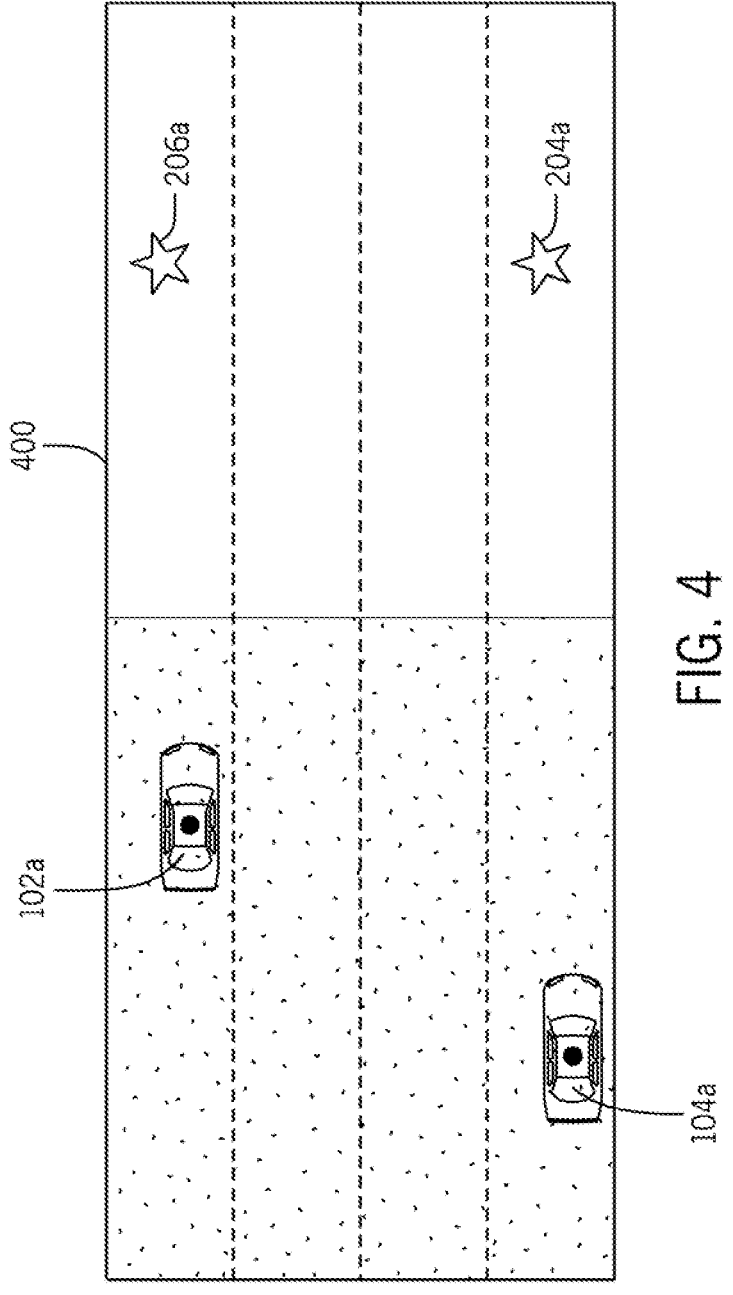
FIG. 4 is an illustrative example of the simulated multi-agent environment model which virtually represents the multi-agent environment according to an exemplary embodiment of the present disclosure.

FIG. 4 includes an illustrative example of the simulated model 400 which virtually represents the multi-agent environment 200 according to an exemplary embodiment of the present disclosure. The simulated model 400 may be processed by the simulation module 132 of the multi-agent application 106 based on the execution of the method 300, as discussed above. In one embodiment, the simulated model 400 may include a simulated virtual model of the ego agent 102 that is provided as a virtual ego agent 102a that is presented in a respective location of a simulated model that replicates the real-world surrounding environment of the ego agent 102 within the multi-agent environment 200. The simulated model 400 may also include a virtual model of the target agent 104 that is provided as a virtual target agent 104a that is presented in a respective location of a simulated model 400 that replicates the real-world location of the target agent 104 within the multi-agent environment 200.

As shown in FIG. 4, the respective goals 204, 206 of the ego agent 102 and the target agent 104 may also be virtually represented within the simulated model 400 as respective virtual goals 204a, 206a. In one or more embodiments, the simulated model 400 may be utilized during one or more executions of the stochastic games with respect to the virtual ego agent 102a representing the ego agent 102 and the virtual target agent 104a representing the target agent 104 to learn one or more agent action policies that are respectively associated with the ego agent 102 and/or the target agent 104.

In some embodiments, the simulated model 400 may also include vehicle dynamic data points (not shown) that may be interpreted by the multi-agent application 106. The vehicle dynamic data points may be represented as a vector with real values parameters that are respectively associated with the virtual ego agent 102a and the virtual target agent 104a. With respect to the virtual ego agent 102a, the real value parameters may correspond to the speed of the virtual ego agent 102a, the steering angle of the virtual ego agent 102a, the acceleration rate of the virtual ego agent 102a, the deceleration rate of the virtual ego agent 102a, and the like. Similarly, with respect to the virtual target agent 104a, the real value parameters may correspond to the speed of the virtual target agent 104a, the steering angle of the virtual target agent 104a, the acceleration rate of the virtual target agent 104a, the deceleration rate of the virtual target agent 104a, and the like. In one embodiment, these real value parameters may be adjusted for the ego agent 102 and/or the target agent 104 based on the training of the neural network 108 to thereby allow the ego agent 102 and the target agent 104 to reach their respective goals 204, 206 without any conflict amongst one another.

Figure 5:
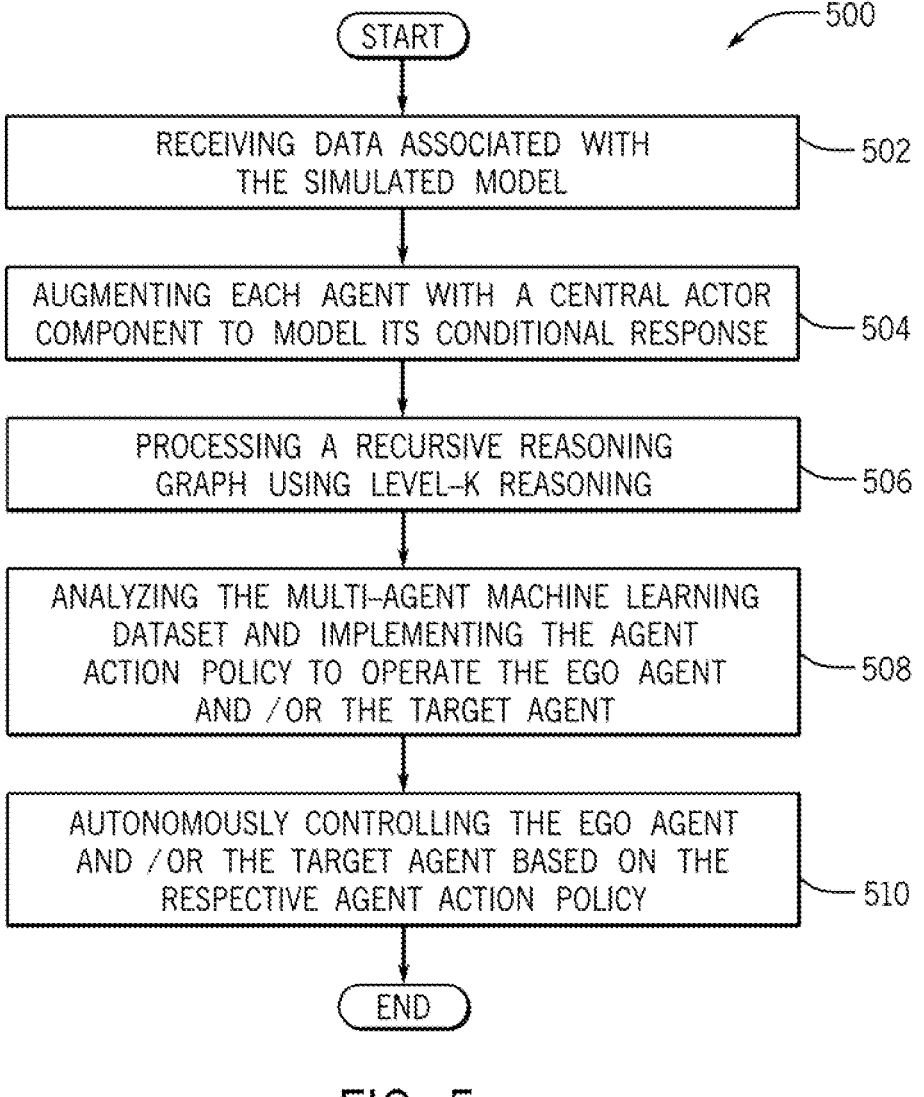
FIG. 5 is a process flow diagram of a method for learning agent action policies that are to be executed to control an ego agent and/or a target agent to operate within the multi-agent environment according to an exemplary embodiment of the present disclosure.

FIG. 5 is a process flow diagram of a method 500 for learning agent action policies that are to be executed to control the ego agent 102 and/or the target agent 104 to operate within the multi-agent environment 200 according to an exemplary embodiment of the present disclosure. FIG. 5 will be described with reference to the components of FIG. 1, FIG. 2, and FIG. 4, though it is to be appreciated that the method of FIG. 5 may be used with other systems/components. The method 500 may begin at block 502, wherein the method 500 may include receiving data associated with the simulated model 400.

In an exemplary embodiment, the simulation module 132 of the multi-agent application 106 may communicate data associated with the simulated model 400 to the policy learning module 134. The policy learning module 134 may evaluate the data and may determine observations associated with the multi-agent environment 200 from the perspective of the ego agent 102 and the target agent 104.

In particular, the policy learning module 134 may evaluate the data associated with the simulated model 400 and may determine the goal 206 of the ego agent 102, a lane 202a on which the ego agent 102 is traveling, additional lanes 202b-202d of the roadway on which the ego agent 102 is traveling, boundaries of the multi-agent environment 200, and the like. Additionally, the policy learning module 134 may evaluate the data associated with the simulated model 400 and may determine the goal 204 of the target agent 104, a lane 202d on which the target agent 104 is traveling, additional lanes 202a-202c of the roadway on which the target agent 104 is traveling, boundaries of the multi-agent environment 200, and the like.

The policy learning module 134 may utilize such data to perform one or more executions of the Markov Games with respect to the virtual ego agent 102a representing the ego agent 102 and the virtual target agent 104a representing the target agent 104 to learn the agent action policies that are associated with the ego agent 102 and/or the target agent 104. Accordingly, the simulated model 400 may be utilized to simulate one or more potential actions that may be performed by the virtual ego agent 102a and/or the virtual target agent 104a to independently reach their respective virtual goals 204a, 206a irrespective of one another. These independent actions may be evaluated using the multi-agent central actor critic model and level-k recursive reasoning to learn the respective agent action policies associated with the ego agent 102 and the target agent 104.

The method 500 may proceed to block 504, wherein the method 500 may include augmenting each agent 102, 104 with a central actor component to model its conditional response. In an exemplary embodiment, upon evaluating the data associated with the simulated model 400 and determining the virtual goals 204a of the virtual ego agent 102a, the lanes 202a-202d of the roadway on which the virtual ego agent 102a and the virtual target agent 104a are traveling, boundaries of the multi-agent environment 200, and the like, the policy learning module 134 may model the relationship between the virtual ego agent 102a and the virtual target agent 104a and consider their responses with auxiliary central actors.

In an exemplary embodiment, using the simulated model 400, the Markov Game may be specified by $$(S, \{A^i\}_{i=1}^n, T, \{r^i\}_{i=1}^n, \text{Reject}, s_0),$$

where n is the number of agents 102a, 104a; S is the state space containing the state for all agents 102a, 104a; A" represent the action space for agent i (where agent i is the virtual ego agent 102a when determining the reward for the virtual ego agent 102a, where agent i is the virtual target agent 104a when determining the reward for the virtual target agent 104a);

$$T : S \times \prod\nolimits_{i=1}^n A^i \times S \to R$$

represents the transition probability conditioned on the current state as well as the actions of all agents 102a, 104a;

$$r^i : S \times \prod\nolimits_{i=1}^n A^i \times S \to R$$

represents the reward for agent i; and $s_0$:S→R represents the initial state distribution of all agents 102a, 104a.

In one embodiment, the learning objective for executing of the Markov Games is to get a set of polices $$\{A^i\}_{i=1}^n,$$

where for each agent i, $A^i$:S→$A^i$ maps the state to its action. However, since the policy learning module 134 may determine an inherent conflict with respect to each self-interested agent that is attempting to reach their respective virtual goals 204a, 206a in a most efficient manner, the policy learning module 134 may utilize a Nash Equilibrium where all agents act in best response to each other's current strategy. In other words, by utilizing the Nash Equilibrium, the virtual ego agent 102a and the virtual target agent 104a may not perform better by unilaterally changing their own strategy.

Using the actor-critic framework, the policy learning module 134 may train the critic, $Q\theta$ (s,a), to estimate the return value of the state-action pair (s,a) with the loss $J_{Q_{\hat{e}}}E_{s,\alpha \sim D}[(Q\theta (s,\alpha) - \hat{Q})]$, where $\mathcal{D}$ is the replay buffer storing the exploration experiences and $\hat{Q}$ is an empirical estimate of the return value. An actor, $\pi\varphi(s)$, is trained to maximize the return value with the loss $J_A \mathcal{K} = E_{s \sim D, a \sim A_{\mathcal{K}(s)}}[-Q\theta(s,a)]$. Additional terms like the policy entropy could also be added to $J\pi\varphi$ to improve the training. In one embodiment, the policy learning module 134 trains a central critic, $$Q_\theta^i(s, a^i, a^{-i}),$$

for each agent i, to estimate the return value of the state and the joint—action; i.e., $$J_{Q_\theta^i} = E_{s, a^i, a^{-i} \sim D}[(Q\theta(s, a^i, a^{-i}) - \hat{Q})].$$

Each actor, $\pi \mathcal{K}^{(s)}i$, is then trained to minimize the loss $J_{A_\mathcal{K}}$ $E_{s \sim D, a^i \sim A_\mathcal{K}(s)} [(Q\theta(s, a^i, a^{-i})]$. The policy learning module 134 uses an equivalent term $Q^*(s, a, a^-)$ for each agent i.

Using centralized-training-decentralized execution, the centralized critic is defined as: $Q^i(s, a^i, a^{-i})$ and the decentralized actor is defined as: $\pi^i(a^i|s)$. The training may be defined as: $Q^i(s, a^i, a^{-i}) \leftarrow r + \gamma V(s')$; $\pi^i(a^i|s) \leftarrow \text{argmax}_a Q^i(s, a^i, a^{-i})$. The centralized critic is thereby utilized to determine how good a particular action is to select an optimum set of actions for the virtual ego agent 102a and the virtual target agent 104a.

Referring again to the method 500 of FIG. 5, the method 500 may proceed to block 506, wherein the method 500 may include processing a recursive reasoning graph using level-k reasoning. In an exemplary, after completion of action selection using the multi-agent actor-critic model, the policy learning module 134 may utilize recursive reasoning as a process of reasoning about the other agent's reasoning process during decision making. For example, the policy learning module 134 may utilize recursive reasoning as a process of reasoning used by the virtual ego agent 102a about the target agent's reasoning process during decision making. This functionality may allow the virtual ego agent 102a to consider the potential change in strategy of the virtual target agent 104a instead of treating the virtual target agent 104a as a fixed agent. Similarly, the policy learning module 134 may utilize recursive reasoning as a process of reasoning used by the virtual target agent 104b about the virtual ego agent's reasoning process during decision making to allow the virtual ego agent 102a to consider the potential change in strategy of the virtual ego agent 102a instead of treating the virtual ego agent 102a as a fixed agent.

Using the level-k reasoning, the policy learning module 134 may complete various levels of reasoning that base the virtual ego agent's operational decisions on the virtual target agent's operational decisions and the virtual target agent's operational decisions on the virtual ego agent's operational decisions. In other words, the policy learning module 134 utilizes the level-k reasoning model to accomplish recursive reasoning. Using the level-k reasoning at level 0, all agents (the virtual ego agent 102a and the virtual target agent 104a) choose their respective actions based on base policies, $A^{(0)}$. The policy learning module 134 executes the level-k reasoning such that at each level k, each agent chooses the best policy by assuming the others follow the level k−1 policy. For example, level 1, level 2, level k the virtual ego agent 102a may choose the best policy by assuming that the virtual target agent 104a follows the virtual ego agent's level k−1 policy.

In multi-agent RL, a natural level-0 policy is the agent's current policy, i.e. $A^{i,(0)} = A^i$. Given the actions of other agents at level k−1: $a^{-i,(k-1)}$, the best level-k action for agent i should be $$a^{i,(k)} = \text{argmax } Q^i(s, a^i, a^{i,(k-1)}) \qquad (1)$$

where $Q^*$ is the estimated return of agent i. This formulation holds for general-sum games.

$$\pi_{c,\psi}^i(s, a^{-i})$$

to approximate $\text{argmax}_{a^i}$ $$Q_\theta^i(s, a^i, a^{-i})$$

by minimizing the loss:

$$J_{\pi_{c,\psi}^i} = E_{s, a^{-i} \sim D, (a^{-i} \sim \pi)_{c,\psi}^i} [-Q_\theta^i(s, a^i, a^{-i})] \qquad (2)s$$

A central actor $$\pi_c^i(s, a^{-i})$$

is introduced which learns the best response for i given state s and the other agents' actions $a^-$.

In an illustrative example, at level zero, the virtual ego agent 102a may treat the virtual target agent 104a as an obstacle based on its base policy $A^{(0)}$.

Level-0: $a^{i,(0)} = \pi^i(a^i|s)$

The policy learning module 134 may thereby execute level one reasoning to allow the virtual ego agent 102a to take into account the actions of the virtual target agent 104a (if the virtual ego agent 102a merges to reach its virtual goal 206a) such that the virtual target agent 104a may brake to allow the virtual ego agent 102a to merge or the virtual target agent 104a may itself simultaneously merge to reach its virtual goal 204a. The policy learning module 134 may thereby execute level level-k reasoning (e.g., level two reasoning) to determine the best action that the virtual ego agent 102a should take based on the prior level (e.g., level one) action of the virtual target agent 104a as this is known based on the virtual ego agent 102a and the virtual target agent 104a both being central actors. Accordingly, Level-k: $a^{i,(k)} = \text{argmax}_{a^i} Q^i(s, a^i, a^{-i,(k-1)})$.

Based on message passing between the central actors, level-k reasoning ensures that at each level k after level zero, each agent's policy takes into account the other agent's actions in determining the best action to be taken to reach the respective virtual goals 204a, 206a of the virtual ego agent 102a and the virtual target agent 104a. In one embodiment, the policy learning module 134 may calculate $a^{-i,k}$ using the message passing process in a recursive reasoning graph R2G: $\mathcal{G} = (\mathcal{V}, \varepsilon)$. A node set $$V = A_c^1, A_c^n$$

contains the central actor node for each agent 102, 104, and the edge set E contains edges between all interacting agents 102, 104. Accordingly, the node set contains the central actor node for the virtual ego agent 102a and the central actor node for the virtual target agent 104a and the edge set contains edges between the virtual ego agent 102a and the virtual target agent 104a.

An undirected fully-connected graph may be used by assuming all agents are interacting with each other. The messages in the edges are the sampled actions $a^{i,k}$ from the central actors. The initial level-0 actions are sampled from the individual policies:

$$a^{-i,0} \sim A^i(s) \tag{3}$$

At each level k≥1, there is:

$$a^{i,k} \sim A_c^i\left(s, AGG_{j \in N} ia^{j,k-1}\right) \tag{4}$$

where AGG is the aggregation function and $\mathcal{N}$ is the node neighborhood function. Since concatenation may be used for AGG, $AGG_{j \in \Lambda} ia^{j,k-1}$ is interchangeable with $a^{-i}$ in fully-connected graphs.

Accordingly, as discussed above, at level k, each central actor node takes the input message of $a^{i,k-1}$ and outputs its best response $a^{i*}$ k. Therefore, one complete message passing through the graph gives one-level up in the recursion. The entire calculation is differentiable with respect to $a^{i,0}$ through re-parameterization. Thus, it provides both the value and gradient information of the higher level responses. The computation complexity scales linearly with the agent number n and the recursion level k.

Figure 6:
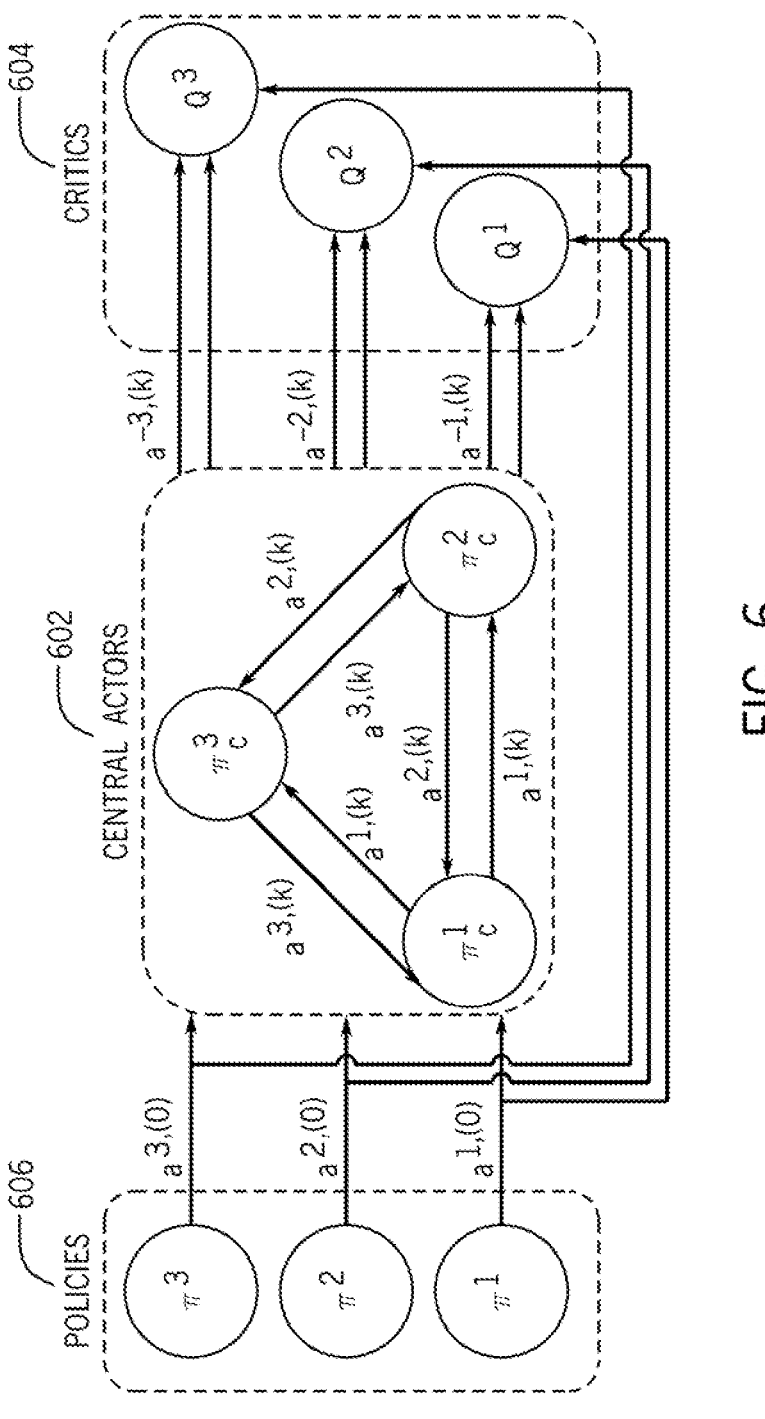
FIG. 6 is an illustrative example of the recursive reasoning graph in a three-agent stochastic game according to an exemplary embodiment of the present disclosure.

FIG. 6 provides an illustrative example of the recursive reasoning graph in a three-agent stochastic game. As shown, the actions of the central actors 602 $a^n$, k may be evaluated by critics 604 to output policies 606 for each of the central actors 602 that include an optimum set of actions for the virtual ego agent 102a and the virtual target agent 104a. Accordingly, level-k recursive reasoning uses the message passing process in a recursive reasoning graph in which a node set of the recursive reasoning graph contains a central actor node for each agent and an edge set contains edges between the ego agent and the target agent. Each actor node takes an input message based on a level-k policy and outputs a response based on a prior level action of an opposing agent.

In one configuration, each component of the recursive reasoning graph is trained such that for the central critic $$Q_e^i,$$

a soft Bellman residual is adopted:

$$J_{Q_e^x} = E_D\left[\left(Q_e^i\left(s, a^i, a^{-i}\right) - \left(r^i\left(s, a^{-i}, a^{-i}\right) + \text{Reject}^\wedge(s')\right)\right)\right] \tag{5}$$

where the next state value V (s') Reject is estimated by:

$$\hat{V}(s') = E_{a^i,0} \sim A_{\mathbb{K}}\left[\text{Reject}^i \log\left(A_{\mathbb{K}}^i\left(a^{i,0} \mid s\right)\right) Q_e^i\left(s, a^{i,0} a^{-i,k}\right)\right] \tag{6}$$

where $\text{Reject}^i$ is the temperature variable trained and $Q_e$Reject is the delayed updated version of the critic network. The individual policy $A_{\mathbb{K}}$ is trained to minimize the KL divergence with respect to the corresponding energy-based distribution represented by $$Q_e^i,$$

using $a^{-i,(k)}$:

$$\pi_{\mathbb{K}} = E_{a^i,0} \sim A_{\mathbb{K}}\left[\text{Reject}^i \log\left(A_{\mathbb{K}}^i\left(a^{i,0} \mid s\right)\right) Q_e^i\left(s, a^{i,0} a^{-i,k}\right)\right] \tag{7}$$

The central actor $A_{c,\mathcal{H}}^i$ is trained by the loss given in equation 2 above. The output of the recursive reasoning graph will be the agent action policy for each of the virtual ego agent 102a and the virtual target agent 104a. In summary, agent action polices output based on the recursive reasoning graph may be shown as: Policy $A_{\mathbb{K}}^i$, , $\forall i \in 1$, n.

In an exemplary embodiment, the policy learning module 134 may be configured to communicate data associated with agent action policy learned for the virtual ego agent 102a and the agent action policy learned for the virtual target agent 104a to the neural network training module 136 of the multi-agent application 106. Upon receiving the data associated with the agent action polices learned by the policy learning module 134, the neural network training module 136 may access the multi-agent machine learning dataset 112 and populate one or more fields associated with each of the ego agent 102 and/or the target agent 104 with respective agent action policies associated with the ego agent 102 and/or the target agent 104 for multiple respective time steps based on multiple executions of the recursive reasoning graph using level-k reasoning. Accordingly, the neural network 108 may be trained with multiple agent action policies for multiple time steps that may be utilized to autonomously control the ego agent 102 and/or the target agent 104 to reach their respective goals 204, 206 without any conflict amongst one another within the multi-agent environment 200.

Referring again to the method 500 of FIG. 5, upon training an agent action policy to account for higher level recursion actions on interaction agents based on utilization of the recursive reasoning graph, the method 500 may proceed to block 508, wherein the method 500 may include analyzing the multi-agent machine learning dataset 112 and implementing the agent action policy to operate the ego agent 102 and/or the target agent 104. In an exemplary embodiment, the agent control module 138 may access the multi-agent machine learning dataset 112 and may analyze the dataset to retrieve an agent action policy that is associated with the ego agent 102 and/or an agent action policy that is associated with the target agent 104 at a particular time step.

The method 500 may proceed to block 510, wherein the method 500 may include autonomously controlling the ego agent 102 and/or the target agent 104 based on the respective agent action policy. In an exemplary embodiment, upon retrieving the agent action policy that is associated with the ego agent 102 and/or an agent action policy that is associated with the target agent 104 at a particular time step, the agent control module 138 may communicate respective data associated with the agent action policy associated with the ego agent 102 and/or the agent action policy associated with the target agent 104 to the ECU 110a of the ego agent 102 and/or the ECU 110b of the target agent 104 to autonomously control the respective agent(s) 102, 104 based on the respective associated agent action policies.

In an exemplary embodiment, the agent control module 138 may analyze the agent action policy associated with the ego agent 102 and/or the target agent 104 and may thereby communicate with the ECU 110a of the ego agent 102 and/or the ECU 110b of the target agent 104 to control the ego agent 102 and/or the target agent 104 to be autonomously (or semi-autonomously) operated (e.g., driven) within the multi-agent environment 200 according to the respective multi-agent policy. The ECU(s) 110a, 110b may communicate with one or more of the respective systems/control units (not shown) to thereby control the ego agent 102 and/or the target agent 104 to thereby follow particular pathways at a respective speed(s), acceleration rate(s), steering angle(s), deceleration rate(s), and the like while maneuvering within the multi-agent environment 200 to reach the respective goals 204, 206 without any conflict.

As an illustrative example, as the ego agent 102 and target agent 104 must cross paths to reach their respective goals 204, 206, as shown in FIG. 2, based on the autonomous control of the agents 102, 104 (based on the execution of respectively associated agent action policies that are based on the level-k recursive reasoning), the agents 102, 104 are able to successfully interact without any conflict. Accordingly, based on the associated agent action policies learned by the multi-agent application 106 and trained to the neural network 108 to be implemented, the target agent 104 may be autonomously controlled to decelerate at a particular deceleration rate to allow the ego agent 102 to merge towards its goal 206. The target agent 104 may subsequently accelerate to efficiently reach its goal 204 after the ego agent 102 passes a potential point of overlap between the agents 102, 104. It is appreciated that alternate types of autonomous controls may be followed based on alternate agent action policies that are based on the level-k recursive reasoning.

FIG. 7 is a process flow diagram of a method 700 for utilizing a recursive reasoning graph in multi-agent reinforcement learning according to an exemplary embodiment of the present disclosure. FIG. 7 will be described with reference to the components of FIG. 1, though it is to be appreciated that the method of FIG. 7 may be used with other systems/components. The method 700 may begin at block 702, wherein the method 700 may include receiving data associated with an ego agent 102 and a target agent 104 that are traveling within a multi-agent environment 200.

The method 700 may proceed to block 704, wherein the method 700 may include utilizing a multi-agent actor-critic framework to analyze the data associated with the ego agent 102 and the target agent 104. The method 700 may proceed to block 706, wherein the method 700 may include performing level-k recursive reasoning based on the multi-agent actor-critic framework to calculate higher level recursion actions of the ego agent 102 and the target agent 104.

In one embodiment, an output of the level-k recursive reasoning is used to learn an agent action policy that is associated with the ego agent 102 and an agent action policy that is associated with the target agent 104. The method 700 may proceed to block 708, wherein the method 700 may include controlling at least one of: the ego agent 102 and the target agent 104 to operate within the multi-agent environment 200 based on at least one of: the agent action policy that is associated with the ego agent 102 and the agent action policy that is associated with the target agent 104.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for utilizing a recursive reasoning graph in multi-agent reinforcement learning, comprising:

receiving data associated with an ego agent and a target agent that are traveling within a multi-agent environment;

utilizing a multi-agent central actor-critic framework to analyze the data associated with the ego agent and the target agent;

wherein:

the multi-agent central actor-critic framework includes a central actor component for each of the ego agent and the target agent;

performing level-k recursive reasoning based on the multi-agent central actor-critic framework to calculate higher level recursion actions of the ego agent and the target agent, wherein:

performing the level-k recursive reasoning includes, representing each of the ego agent and the target agent as a respective central actor node in the recursive reasoning graph, receiving, by each central actor component, data reflecting prior level actions of other central actor nodes using a message passing between central actor nodes, and generating a higher-level response action as part of the level-k recursive reasoning including updating level-k actions for each central actor node by incorporating prior level actions of other central actor nodes, wherein an output of the level-k recursive reasoning is used to learn an agent action policy that is associated with the ego agent and an agent action policy that is associated with the target agent; and autonomously controlling at least one operational system of: the ego agent and the target agent to operate within the multi-agent environment based on at least one of: the agent action policy that is associated with the ego agent and the agent action policy that is associated with the target agent, by executing the agent action policy learned from the level-k recursive reasoning on an electronic control unit (ECU) of the ego agent or the target agent to actuate at least one of vehicle steering, acceleration, or braking.

2. The computer-implemented method of claim 1, wherein receiving data associated with the multi-agent environment includes receiving image data and LiDAR data from at least one of the: ego agent and the target agent, and wherein the image data and LiDAR data are processed using artificial intelligence capabilities to conduct multimodal fusion into the fused environmental data.

3. The computer-implemented method of claim 2, wherein the image data and the LiDAR data are aggregated to determine a simulated multi-agent environment in which a simulation of a virtual environment is processed to execute at least one iteration of a stochastic game.

4. The computer-implemented method of claim 3, wherein utilizing the multi-agent central actor-critic framework includes augmenting the ego agent and the target agent based on the central actor component to model each agent's conditional response to one another within the at least one iteration of the stochastic game.

5. The computer-implemented method of claim 4, wherein utilizing the multi-agent central actor-critic framework includes determining a reward for each agent, wherein a transition probability is conditioned on a current state of each agent as well as actions of the ego agent and the target agent, wherein a Nash Equilibrium is utilized where the ego agent and the target agent act in response to each other's current strategy.

6. The computer-implemented method of claim 1, wherein the level-k recursive reasoning further includes using a message passing process in the recursive reasoning graph, wherein a node set of the recursive reasoning graph contains the central actor node for each agent and an edge set contains edges between the ego agent and the target agent, wherein each central actor node takes an input message based on a level-k policy and outputs the higher level response based on the prior level actions of an opposing agent.

7. The computer-implemented method of claim 1, wherein the level-k recursive reasoning further includes implementing a level-zero policy as a base policy, wherein the ego agent and the target agent treat each other as obstacles in reaching respective goals based on the level-zero policy.

8. The computer-implemented method of claim 7, wherein the level-k recursive reasoning further includes implementing a level-k policy of each agent that takes into account actions of an opposing agent that are based on past actions of a respective agent.

9. The computer-implemented method of claim 8, wherein complete message passing through the recursive reasoning graph gives one-level up in recursion, wherein the agent action policy is output for the ego agent and the agent action policy is output for the target agent based on respective level-k policies output from the recursive reasoning graph.

10. A system for utilizing a recursive reasoning graph in multi-agent reinforcement learning, comprising:
    a memory storing instructions when executed by a processor cause the processor to:
    receive data associated with an ego agent and a target agent that are traveling within a multi-agent environment;
    utilize a multi-agent central actor-critic framework to analyze the data associated with the ego agent and the target agent;
    wherein:

the multi-agent central actor-critic framework includes a central actor component for each of the ego agent and the target agent;
perform level-k recursive reasoning based on the multi-agent central actor-critic framework to calculate higher level recursion actions of the ego agent and the target agent,
wherein:
performing the level-k recursive reasoning includes, representing each of the ego agent and the target agent as a respective central actor node in the recursive reasoning graph, receiving, by each central actor component, data reflecting prior level actions of other central actor nodes using a message passing between central actor nodes, and
generating a higher-level response action as part of the level-k recursive reasoning including updating level-k actions for each central actor node by incorporating prior level actions of other central actor nodes, wherein an output of the level-k recursive reasoning is used to learn an agent action policy that is associated with the ego agent and an agent action policy that is associated with the target agent; and
autonomously control at least one operational system of: the ego agent and the target agent to operate within the multi-agent environment based on at least one of: the agent action policy that is associated with the ego agent and the agent action policy that is associated with the target agent, by executing the agent action policy learned from the level-k recursive reasoning on an electronic control unit (ECU) of the ego agent or the target agent to actuate at least one of vehicle steering, acceleration, or braking.

11. The system of claim 10, wherein receiving data associated with the multi-agent environment includes receiving image data and LiDAR data from at least one of the: ego agent and the target agent, and wherein the image data and LiDAR data are processed using artificial intelligence capabilities to conduct multimodal fusion into the fused environmental data.

12. The system of claim 11, wherein the image data and the LiDAR data are aggregated to determine a simulated multi-agent environment in which a simulation of a virtual environment is processed to execute at least one iteration of a stochastic game.

13. The system of claim 12, wherein utilizing the multi-agent central actor-critic framework includes augmenting the ego agent and the target agent based on the central actor component to model each agent's conditional response to one another within the at least one iteration of the stochastic game.

14. The system of claim 13, wherein utilizing the multi-agent central actor-critic framework includes determining a reward for each agent, wherein a transition probability is conditioned on a current state of each agent as well as actions of the ego agent and the target agent, wherein a Nash Equilibrium is utilized where the ego agent and the target agent act in response to each other's current strategy.

15. The system of claim 10, wherein the level-k recursive reasoning further includes using a message passing process in the recursive reasoning graph, wherein a node set of the recursive reasoning graph contains the central actor node for each agent and an edge set contains edges between the ego agent and the target agent, wherein each central actor node takes an input message based on a level-k policy and outputs the higher level response based on the prior level actions of an opposing agent.

16. The system of claim 10, wherein the level-k recursive reasoning further includes implementing a level-zero policy as a base policy, wherein the ego agent and the target agent treat each other as obstacles in reaching respective goals based on the level-zero policy.

17. The system of claim 16, wherein the level-k recursive reasoning further includes implementing a level-k policy of each agent that takes into account actions of an opposing agent that are based on past actions of a respective agent.

18. The system of claim 17, wherein complete message passing through the recursive reasoning graph gives one-level up in recursion, wherein the agent action policy is output for the ego agent and the agent action policy is output for the target agent based on respective level-k policies output from the recursive reasoning graph.

19. A non-transitory computer readable storage medium storing instructions that when executed by a computer, which includes a processor for performing a method, the method comprising:

receiving data associated with an ego agent and a target agent that are traveling within a multi-agent environment;

utilizing a multi-agent central actor-critic framework to analyze the data associated with the ego agent and the target agent;

wherein:

the multi-agent central actor-critic framework includes a central actor component for each of the ego agent and the target agent;

performing level-k recursive reasoning based on the multi-agent central actor-critic framework to calculate higher level recursion actions of the ego agent and the target agent, wherein:

performing the level-k recursive reasoning includes, representing each of the ego agent and the target agent as a respective central actor node in the recursive reasoning graph, receiving, by each central actor component, data reflecting prior level actions of other central actor nodes using a message passing between central actor nodes, and generating a higher-level response action as part of the level-k recursive reasoning including updating level-k actions for each central actor node by incorporating prior level actions of other central actor nodes, wherein an output of the level-k recursive reasoning is used to learn an agent action policy that is associated with the ego agent and an agent action policy that is associated with the target agent; and autonomously controlling at least one operational system of: the ego agent and the target agent to operate within the multi-agent environment based on at least one of: the agent action policy that is associated with the ego agent and the agent action policy that is associated with the target agent, by executing the agent action policy learned from the level-k recursive reasoning on an electronic control unit (ECU) of the ego agent or the target agent to actuate at least one of vehicle steering, acceleration, or braking.

20. The non-transitory computer readable storage medium of claim 19, wherein the level-k recursive reasoning further includes using a message passing process in the recursive reasoning graph, wherein a node set of the recursive reasoning graph contains the central actor node for each agent and an edge set contains edges between the ego agent and the target agent, wherein each central actor node takes an input message based on a level-k policy and outputs the higher level response based on the prior level actions of an opposing agent.

* * * * *